United States Patent [19]

Kito et al.

[11] Patent Number: 4,947,967
[45] Date of Patent: Aug. 14, 1990

[54] LOCKING APPARATUS FOR SHIFT LEVER IN AUTOMATIC TRANSMISSION

[75] Inventors: Shozo Kito, Aichi; Shoichi Harada, Gifu; Hajime Imai; Tadao Muramatsu, both of Aichi, all of Japan

[73] Assignees: Kabushiki Kaisha Tokai-Rika-Denki-Seisakusho; Toyota Jidosha Kabushiki Kaisha, both of Japan

[21] Appl. No.: 265,445

[22] Filed: Nov. 1, 1988

[30] Foreign Application Priority Data

Nov. 5, 1987 [JP] Japan .................. 62-169320

[51] Int. Cl.⁵ .......................................... B60K 41/26
[52] U.S. Cl. ................................ 192/4 A; 74/483 R
[58] Field of Search ..................... 192/4 A; 74/483 R

[56] References Cited

U.S. PATENT DOCUMENTS

| 243,759 | 9/1888 | Imai et al. | |
|---|---|---|---|
| 3,859,828 | 1/1975 | Ibuka et al. | |
| 3,942,614 | 3/1976 | Thompson . | |
| 4,187,935 | 2/1980 | O'Hern | 192/4 A |
| 4,473,141 | 9/1984 | Mochida . | |
| 4,474,085 | 10/1984 | DeVogelaere et al. | |
| 4,520,640 | 6/1985 | Kramer . | |
| 4,572,340 | 2/1986 | Pierce | 192/4 A X |
| 4,645,046 | 2/1987 | Takaro et al. | 192/4 A |
| 4,660,443 | 4/1987 | Simancik | 192/4 A X |
| 4,671,085 | 6/1987 | Yamaguchi et al. | |
| 4,724,722 | 2/1988 | Beauch et al. | |
| 4,768,610 | 9/1988 | Pagel et al. | 192/4 A X |

FOREIGN PATENT DOCUMENTS

| 53-45573 | 1/1975 | Japan . |
|---|---|---|
| 50-54733 | 5/1975 | Japan . |
| 56-19451 | 2/1981 | Japan . |
| 57-42424 | 3/1982 | Japan . |
| 57-148222 | 9/1982 | Japan . |
| 57-163427 | 10/1982 | Japan . |
| 59-176253 | 11/1984 | Japan . |
| 60-20447 | 2/1985 | Japan . |
| 60-20448 | 2/1985 | Japan . |
| 60-23427 | 2/1985 | Japan . |
| 60-135352 | 7/1985 | Japan . |
| 61-143825 | 7/1986 | Japan . |
| 62-20343 | 5/1987 | Japan . |

Primary Examiner—Laurie K. Cranmer
Attorney, Agent, or Firm—Finnegan, Henderson, Farabow, Garrett & Dunner

[57] ABSTRACT

A locking apparatus for a shift lever in an automatic transmission of a vehicle which permits the shift lever to move from a vehicle non-driving position to a vehicle driving position by means of an electrically operated member, such as a solenoid, in the presence of a predetermined condition such as that of applying a brake pedal. When the shift lever is located in the non-driving position, a detent pin for inhibiting the shift lever from shifting is engaged with a lock recess formed in a lock member and the lock member is held in a lock position by means for the electrically operated member. Even though the electrically operated member fails to function due to a malfunction or the like, an occupant can manually shift the shift lever from the non-driving position to the driving position in order to move the vehicle.

21 Claims, 6 Drawing Sheets

LOCKING APPARATUS FOR SHIFT LEVER IN AUTOMATIC TRANSMISSION

BACKGROUND OF THE INVENTION

1. FIELD OF THE INVENTION

The present invention relates generally to a locking apparatus for a shift lever in an automatic transmission and, more particularly, to a locking apparatus comprised to lock a shift lever against rotation in a particular non-driving position on the basis of a predetermined condition.

2. DESCRIPTION OF THE RELATED ART

In general, with respect to a vehicle which is equipped with an automatic transmission, a parking brake is applied and a shift lever is shifted to a "P" position for securing the vehicle in a firmly braked state during parking, and an occupant leaves the vehicle thereafter. When an engine of the vehicle is started at a "P" position of the shift lever and the shift lever is shifted to a "D" position to run the vehicle, the shift lever always passes through an "R" position at an intermediate point. Accordingly, it is desirable that a foot brake be applied until the shift lever is moved from the "P" position to the "D" position.

The above-described operation of the shift lever and other operations are carried out relative to each other, and it has been considered that if such an associated operation of brake application is not achieved, the shift lever is kept locked in the "P" position so as not to be capable of shifting to any other position.

For instance, Japanese Utility Model Laid-open No. 20343/1987 proposes an arrangement that a shift lever is inhibited against rotation when a foot brake is not operative.

In the arrangement disclosed in the above-described Japanese Utility Model Laid-open No. 20343/1987, there is a problem that if any electrical trouble occurs, the shift lever cannot be released from its locked state.

Japanese Utility Model Laid-open No. 176253/1984 discloses a manual lever apparatus in which a locked state of a shift lever can be manually released even if electricity is not being supplied to a solenoid adapted to restrict movement of the shift lever. This apparatus is arranged such that a plunger pin which is driven by the solenoid directly contacts a detent pin which serves to hold the shift lever in a parking position, and the shift lever is restricted against movement. In this apparatus, there can be problems where the portion of the plunger pin that contacts the detent pin is scratched, and the plunger pin can not be smoothly drawn into the solenoid.

SUMMARY OF THE INVENTION

It is, therefore, an object of the present invention to provide a locking apparatus for a shift lever in an automatic transmission to lock the shift lever so that the shift lever cannot be shifted from a particular non-driving position to a driving position as long as a predetermined condition is not satisfied. The apparatus of the present invention is able to forcibly release the shift lever from its locked state when any trouble occurs during the locked state of the shift lever, additionally this apparatus has good durability. Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the above and other objects, the locking apparatus of this invention for a shift lever of an automatic transmission of a vehicle to permit the shift lever to become operable under predetermined conditions, which comprises detent means for inhibiting the shift lever from shifting to a vehicle driving position, at which the automatic transmission is set at a vehicle driving position, when the shift lever is set at a vehicle non-driving position, the detent means being movable between a shift-lever operating position and a lock position, a lock member being movable together with the detent means between the lock position and the shift-lever operating position, at the non-driving position at which the automatic transmission shift lever is set in a vehicle non-driving position, shift-lever releasing means for moving the detent means from the lock position to the shift-lever operating position to allow the shift lever to be shifted, electrically operated means for holding the lock member to keep the detent means at the lock position and for releasing the held lock member in response to an electrical signal based on predetermined conditions thereby to make the shift-lever releasing means operable, and manual release means for releasing the held lock member and for allowing the shift lever to be shifted even when the shift-lever releasing means has not been made operable by the electrically operated means, whereby, the shift lever is able to be shifted to enable the vehicle to be moved even when the electrically operated means is inoperable.

In the locking apparatus of the above-described arrangement and construction, when the shift lever is shifted to a non-driving position such as the "P" position, the detent apparatus is moved to the lock position for inhibiting the shifting of the shift lever. When the shift lever is shifted to the non-driving position, the lock member together with the detent apparatus is moved to the lock position and this locked state is held by the electrically operated apparatus. Accordingly, movement of the detent pin from the lock position is inhibited and, even though the shift-lever releasing apparatus is operated, the shift lever cannot be shifted to another position. When the occupant operates a brake or the like, the electrically operated apparatus releases the restriction of the lock member and, therefore, the occupant is allowed to perform shifting of the shift lever by operating the shift lever releasing apparatus. In addition, since the electrically operated apparatus does not directly engage with the detent apparatus, the electrically operated apparatus is not damaged even thought an excessive force is applied to the shift lever or the shift lever releasing apparatus in a state wherein the shifting of the shift lever is inhibited. Even though the lock member is held in the lock position, should trouble of the electrically operated apparatus or the like occur, the occupant can operate the manual release apparatus to release the locked state of the lock member, so that the occupant can operate the shift-lever releasing apparatus and the shift lever.

The accompanying drawing, which are incorporated in and constitute a part of this specification, illustrate one embodiment of the invention and, together with the description, serve to explain the principles of the invention.

DESCRIPTION OF THE PREFERRED EMBODIMENT

An embodiment of the present invention will be described below with reference to the accompanying drawings.

Figure 1:
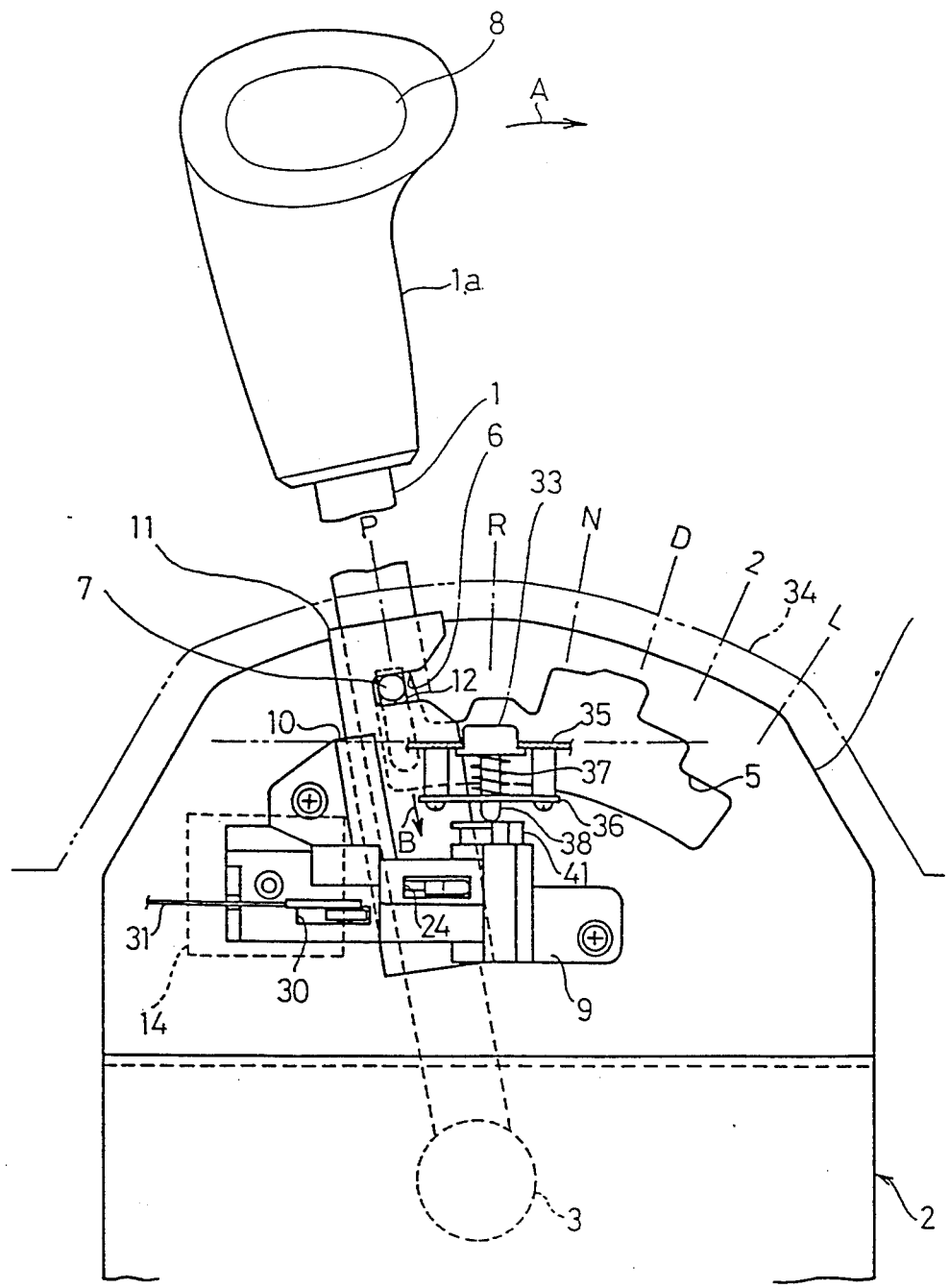
FIG. 1 is a diagrammatic sectional side view of an embodiment constructed in accordance with the teachings of the present invention.

Referring first to FIG. 1, a shift lever 1 is supported by a shaft 3 mounted in a frame 2, and can be rotated, both in the direction indicated by an arrow head A and in the direction opposite thereto, about the shaft 3 which serves as a fulcrum. A detent plate 4 is fixed to the frame 2, and an engagement aperture 5 is formed in the detent plate 4. The engagement aperture 5 has an engagement surface which has a configuration that allows the shift lever 1 to be selectively located at a "P (parking)" position, an "R (reverse)" position, an "N (neutral)" position, a "D (drive)" position, a "2 (second)" position and an "L (low)" position, all of which are serially arranged in the direction of rotation of the shift lever 1. The engagement surface of the engagement aperture 5 has a lock recess 6 at a location corresponding to the "P" position which is one of selected non-driving positions. A detent pin 7 is provided at a lower portion of the shift lever 1 so as to engage with the engagement aperture 5 formed in the detent plate 4, and the detent pin 7 is capable of travelling along the axis of the shift lever 1. When a pushbutton 8 provided on a knob 1a of the shift lever 1 is depressed, the detent pin 7 is caused to travel to its lower position, which corresponds to a shift-lever operating position, and is thus disengaged from the engagement surface of the position that the detent pin 7 has been engaged. When the depression of the pushbutton 8 is released, the detent pin 7 is caused to travel to its upper position, which serves as a lock position, and thus engages with the engagement surface of any one of the six positions provided in the engagement aperture 5. In this state, the detent pin 7 cooperates with the detent plate 4 to restrict the rotary operation of the shift lever 1.

Figure 2:
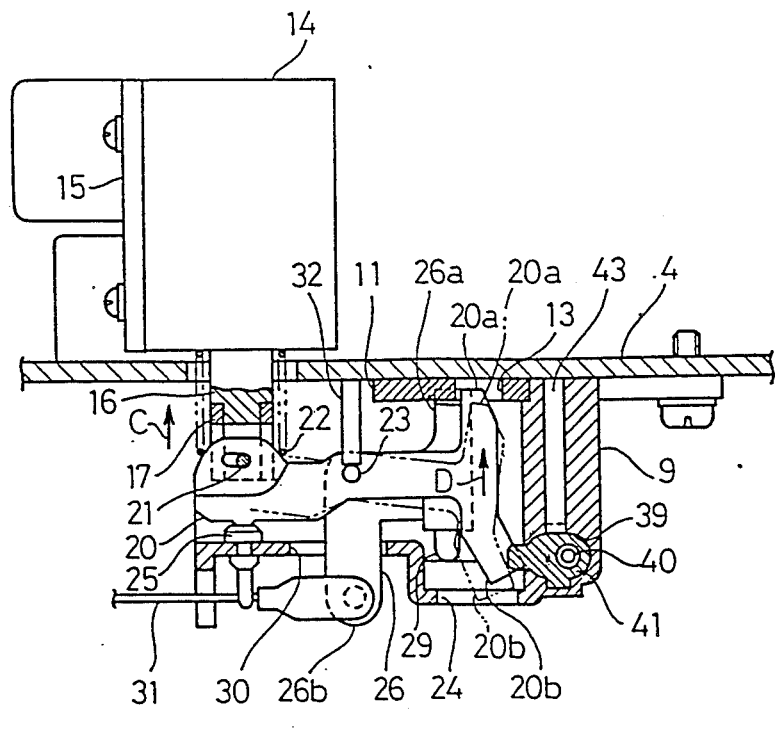
FIG. 2 is a cross sectional view of an essential portion shown in FIG. 1.

As shown in FIG. 1, as well as FIG. 2, a bracket 9 is fixed to one side of the detent plate 4, and a lock member 11 is carried by a guide 10 of the bracket 9 in such a manner that the lock member 11 can slide in both the direction indicated by an arrow head B and in the direction opposite thereto. An engagement recess 12 which opens to the right as viewed in FIG. 1 to face the lock recess 6 is formed in an upper portion of the lock member 11. A rectangular opening 13 of approximately rectangular shape is, as shown in FIG. 3, formed in a lower portion of the lock member 11, and a projection 13a is formed at the left-hand upper corner of the opening 13.

A solenoid 14 which serves as an electrically operated member is fixed to a mounting member 15 on the reverse side of the detent plate 4. An actuator 16 of the solenoid 14 extends into the bracket 9 through the detent plate 4, and a bushing 17 is attached to the extending end of the actuator 16. The solenoid 14 is connected to a control device 19 through lead wires 18. The control device 19 outputs "on" signals only when the shift lever 1 is located in the "P" position and when a foot brake (not shown) is applied. In response to the "on" signal, the solenoid 14 is energized (activated) to draw the actuator in the direction indicated by an arrow head. Except for the above-described case, the supply of electricity to the solenoid 14 is always off. A first link 20 of approximately T-like shape is coupled pivotally at its one end to the distal end of the actuator 16 by means of a pin 21. A compression coil spring 22 is disposed between the end of the first link 20 and the facing side of the solenoid 14, and the actuator 16 is urged in the direction opposite to the arrow head C by the compression coil spring 22. In the bracket 9, the first link 20 is rotatably supported by a pin 23. When the supply of electricity to the solenoid 14 is off, the actuator 16 is moved in the direction opposite to the arrow head C by the urging force of the compression coil spring 22 and, at the same time, the link 20 is rotated about the pin 23 in the direction indicated by an arrow head D toward the position shown by a solid line in FIG. 2. Thus, a lateral end 20a formed at the other end of the first link 20 is inserted into the opening 13 in the lock member 11. When the solenoid 14 is energized, the actuator 16 is drawn in the direction indicated by the arrow head C and, at the same time, the first link 20 is rotated in the direction opposite to the arrow head D. Thus, the lateral end 20a is moved out of the opening 13, while the other lateral end 20b is inserted into an opening 24 formed in the bracket 9. A stopper 25 is attached to the bracket 9 in such a manner that the corresponding end of the first link 20 which has been rotated in the direction of the arrow head D may come into contact with the stopper 25.

In addition to the first link 20, a second link 26 of approximately Z-like shape is rotatably supported by the pin 23 in the bracket 9. A mounting portion 27 is formed on the link 26, projection piece 29 is supported in the mounting portion 27 by means of a compression coil spring 28. The projection piece 29 is maintained in contact with a corresponding inner surface of the bracket 9, and the second link 26 is urged in the direction of the arrow head D by the urging force of the compression coil spring 28. One end 26a of the second link 26 is, as shown in FIG. 4, formed in the shape of an inclined surface and opposes the projection 13a. The other end 26b extends through an opening 30 formed in the bracket 9 and projects therefrom. One end of a control wire 31 is connected to the projecting end and, although not shown, a steering lock is provided at the other end of the control wire 31. The steering lock can be locked in the state shown in FIG. 2 in which the second link 26 has been biased in the direction of the arrow head D. When the steering lock is locked, the rotation of the second link 26 in the direction opposite to the arrow head D is inhibited, whereas when the steering lock is unlocked, the second link 26 is allowed to rotate in the direction opposite to the arrow head D. In FIGS. 2 and 3, reference numeral 32 denotes a securing member which is inserted into the bracket 9 so as to inhibit the travel of the pin 23.

Figure 3:
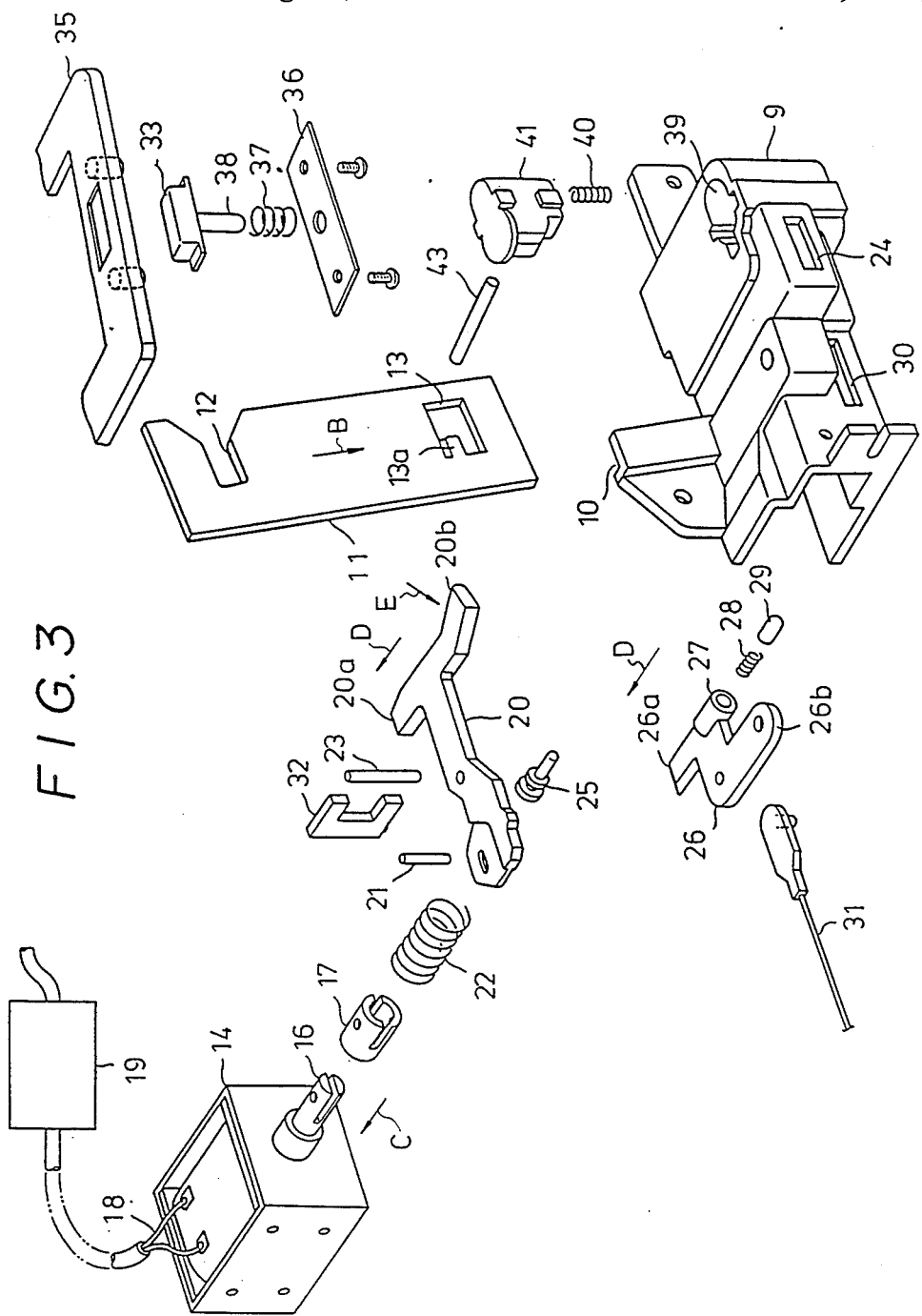
FIG. 3 is an exploded perspective view showing the essential portion of the embodiment.
Figure 4:
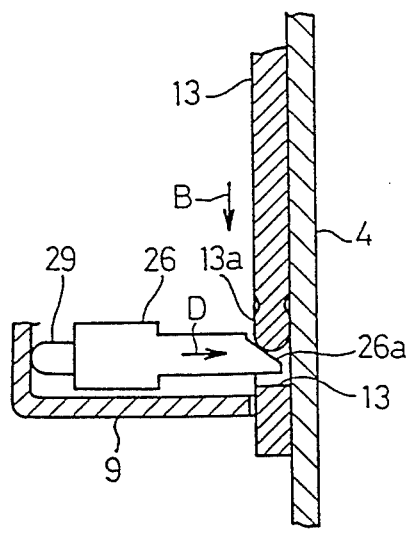
FIG. 4 is an enlarged vertical sectional view of a second link and an opening portion of a lock member.
Figure 5:
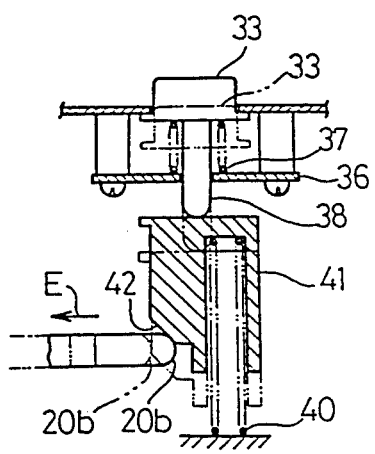
FIG. 5 is an enlarged vertical sectional view of a manual release member, a slide member and a portion of a first link.

Referring to FIGS. 1 and 3, to cover the detent plate 4 and its associated members, a cover 34 is disposed above them, and a manual release member 33 constituted by a pushbutton is provided in a frame 35 of the cover 34. The manual release member 33 is urged upwardly by a compression coil spring 37 disposed between the manual release member 33 and a mounting plate 36, while a projection 38 which is formed on the underside of the manual release member 33 extends through the mounting plate 36 in the downward direction. At a location below the manual release member 33, a slide member 41 is vertically movably supported by means of a compression coil spring 40 in a mounting portion formed in the bracket 9. The slide member 41 has an inclined surface 42 which, as shown in FIG. 5, is brought into contact with the lateral end 20b at the other end of the first link 20 when the first link 20 has been rotated in the direction of the arrow head D. In FIGS. 2 and 3, reference numeral 43 denotes a pin for preventing the slide member 41 from coming off upwardly.

The operation of the locking apparatus having the above-described arrangement and construction will be described below.

If the shift lever 1 is returned to the "P" position when the steering lock (not shown) is locked and if the foot brake (not shown) is not applied, the detent pin 7 is, as shown in FIG. 1, engaged with the lock recess 6 in the detent plate 4, while the engagement recess 12 of the lock member 11 is engaged with the detent pin 7. The lock member 11 is, therefore, located at its upper position, that is, a lock position. In this state, since the steering lock is locked, the second link 26 is rotated in the direction of the arrow head D and the inclined-surface portion of the end 26a of the second link 26 enters the portion of the opening 13 which is below the projection 13a of the lock member 11. Further, since the supply of electricity to the solenoid 14 is off, the actuator 16 of the solenoid 14 is moved to a restricting position by the urging force of the compression coil spring 22 in the direction opposite to the arrow head C. Thus, the first link 20 is rotated in the direction of the arrow head D and the lateral end 20a of the first link 20 is inserted into the opening 13 in the lock member 11. In this state, accordingly, the movement, in the direction of the arrow B, of the lock member 11 engaged with the detent pin 7 is inhibited by the first and second links 20 and 26. Since downward movement of the detent pin 7 is restricted, even though the pushbutton 8 of the shift lever 1 is depressed, the shift lever 1 cannot be shifted from the "P" position to another position. In this manner, the shift lever 1 is locked against rotation at the "P" position.

In this state, when an engine key is rotated to unlock the steering lock, the second link 26 is allowed to rotate in the direction opposite to the arrow head D. However, since the supply of electricity to the solenoid 14 remains off and the first link 20 is biased in the direction of the arrow head D, the movement of the lock member 11 in the direction of the arrow head B remains inhibited. Accordingly, the shift lever 1 remains locked against rotation in the "P" position.

Figure 6:
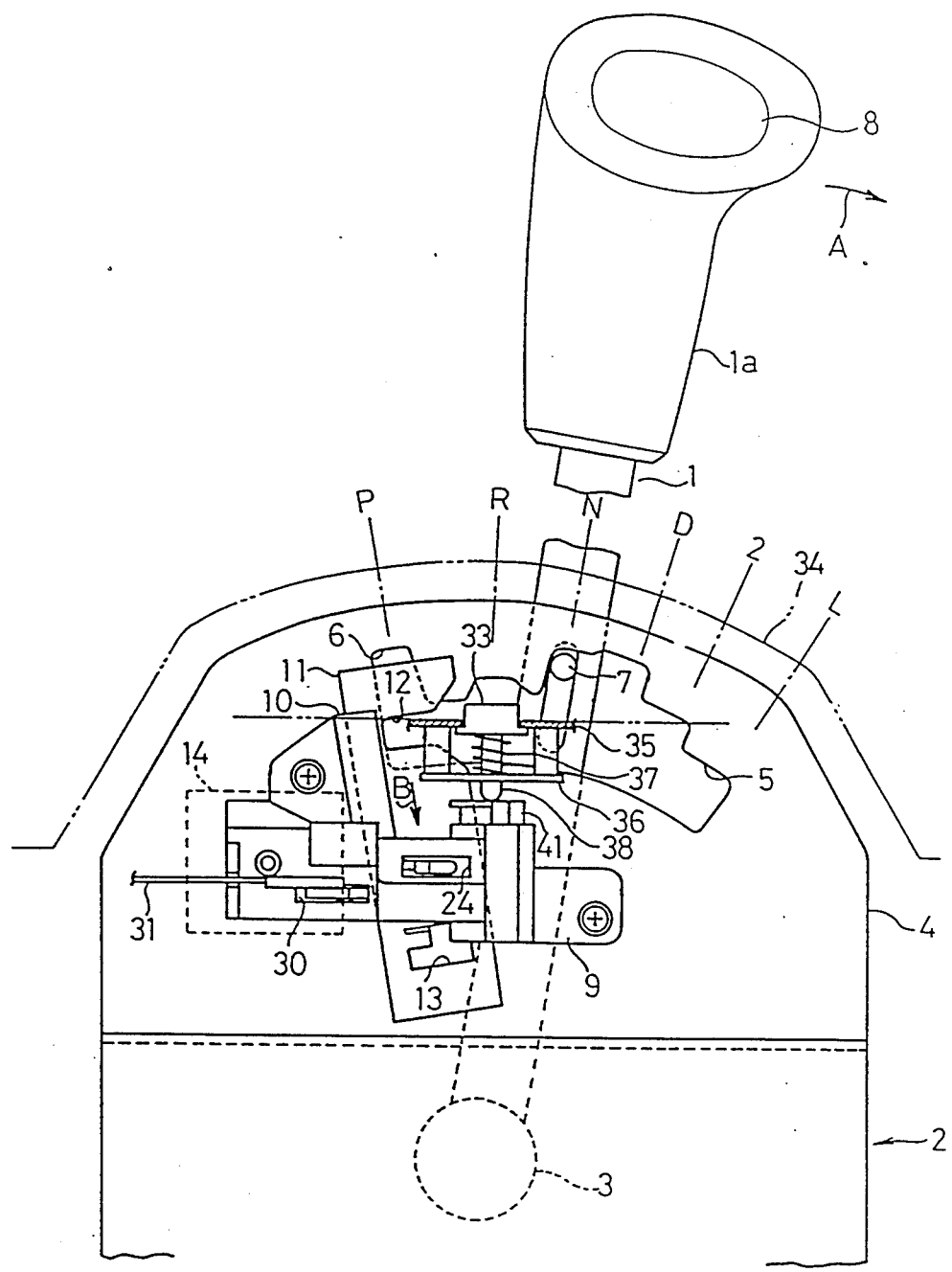
FIG. 6 is a diagrammatic sectional side view of the embodiment showing an operational state different from the state shown in FIG. 1.

In this state, when the foot brake is applied, the solenoid 14 is energized to draw the actuator 16 in the direction of the arrow head C, and thus the actuator 16 is located at a release position. In the meantime, the first link 20 is rotated in the direction opposite to the arrow head D and thus the lateral end 20a of the first link 20 is moved out of the opening 13 in the lock member 11. In this state, when the pushbutton 8 is depressed, the detent pin 7 together with the lock member 11 is moved downwardly (in the direction of the arrow head B) and thus, as shown in FIG. 4, the projection 13a in the opening 13 of the lock member 11 presses the end 26a of the second link 26 in the downward direction, thereby causing the second link 26 to rotate in the direction opposite to the arrow D. In this fashion, the lock member 11 is, as shown in FIG. 6, located in a lock release position. In this state, since the detent pin 7 is disengaged from the lock recess 6, the shift lever 1 can be shifted from the "P" position to another position by shifting the shift lever 1 in the direction of the arrow A while depressing the pushbutton 8.

Figure 7:
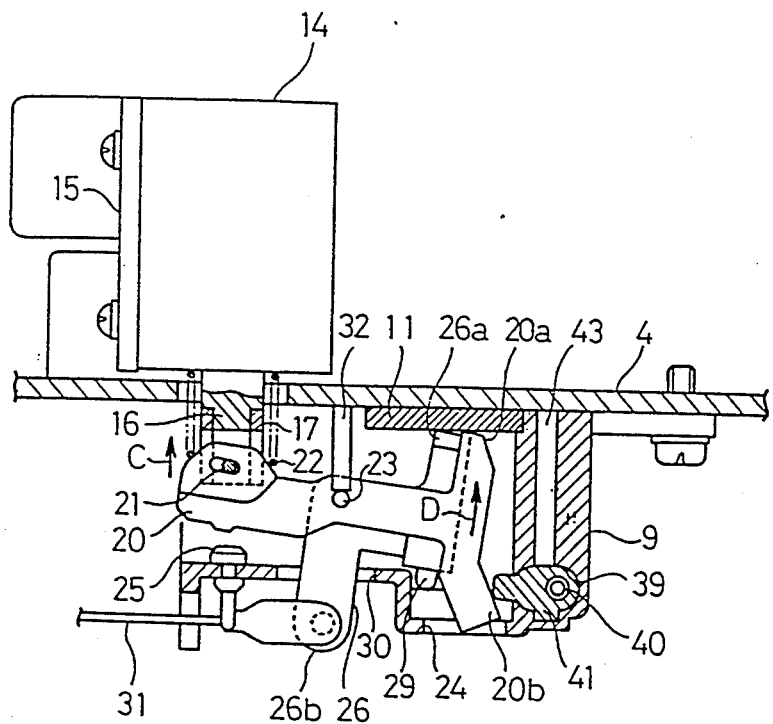
FIG. 7 is a cross sectional view of the essential portion the state shown in FIG. 6.

When, as shown in FIG. 6, the shift lever 1 is shifted to any one of the positions other than the "P" position, for example, the "N" position, the solenoid 14 is deenergized. The actuator 16 is, as shown in FIG. 7, move in the direction opposite to the arrow head C by the urging force of the compression coil spring 22, and thus the lateral end 20a of the first link 20 is brought into contact with the facing side of the lock member 11 which is above the opening 13. In this state, the end 26a of the second link 26 is also brought into contact with the facing side of the lock member 11 which is above the opening 13 and thus the second link 26 is biased in the direction opposite to the arrow head D. Accordingly, the steering lock cannot be locked and the engine key cannot be pulled out.

When the shift lever 1 is shifted to the "P" position from another position while pushbutton 8 is being depressed, the detent pin 7 engages with the engagement recess 12 of the lock member 11. In this state, when the depression of the pushbutton 8 is released, the lock member 11 together with the detent pin 7 travels in the direction opposite to the arrow head B (upwardly), and the detent pin 7 engages with the lock recess 6, while the lock member 11 is located at its locked position. When the lateral end 20a of the first link 20 which has been maintained in contact with the side of the lock member 11 faces the opening 13, the first link 20 is rotated in the direction of the arrow head D by the urging force of the compression coil spring 22 and thus the lateral end 20a is inserted into the opening 13. Simultaneously, when the end 26a of the second link 26 faces the area below the projection 13a formed in the opening 13, the second link 26 is rotated in the direction of the arrow head D by the urging force of the compression coil spring 28 and thus the end 26a is inserted into the opening 13. In this fashion, as shown in FIG. 2, the shift lever 1 is non-rotatably locked in the "P" position. In this state, if the steering lock is locked, the engine key can be pulled out.

In a case where, for example, the battery goes dead or the solenoid 14 fails to function in a state wherein the shift lever 1 is locked as shown in FIGS. 1 and 2, if the engine key is rotated to unlock the steering lock, rotation of the second link 26 in the direction opposite to the arrow head D will be allowed. However, if the solenoid 14 is not energized, the first link 20 remains biased in the direction of the arrow head D even if the foot brake is depressed. Accordingly, the lateral end 20a of the first link 20 cannot be moved out of the opening 13, and hence the locked state of the shift lever 1 cannot be released. In such case, when the manual release member 33 (FIG. 5) provided in the frame 35 is depressed, the slide member 41 is pressed downwardly by means of the projection 38 and the inclined surface 42 of the slide member 41 presses the lateral end 20b of the first link 20 in the direction indicated by an arrow head E in FIG. 5. Thus, the first link 20 is rotated in the direction opposite to the arrow head D against the urging force of the compression coil spring 22, and the lateral end 20a of the first link 20 is moved out of the opening 13 to the position shown by a two-dot-chain line in FIG. 2. In consequence, since the movement of the lock member 11 by the depression of the pushbutton 8 is allowed, the locked state of the shift lever 1 can be released.

In the above-described embodiment, in a state wherein the shift lever 1 is located in the "P" position, when the foot brake is not applied, the shift lever 1 cannot be shifted from the "P" position to another position even if the steering lock is unlocked. Accordingly, it is possible to positively prevent the occurrence of the potential for trouble where, when a vehicle is to be started with the shift lever 1 located in the "P" position, an occupant forgets to put on the foot brake and mistakenly shifts the shift lever 1 to a driving position. In addition, as long as the shift lever 1 is not shifted to the "P" position, the engine key cannot be pulled out when the steering lock is locked. Accordingly, it is possible to prevent the occupant from mistakenly pulling out the engine key during running of the vehicle. Furthermore, when the driver needs to leave the vehicle which has been parked, he must always shift the shift lever 1 to the "P" position, rotate the engine key to the lock position, and pull it out of the steering lock. Accordingly, the occupant can leave the vehicle after the vehicle has been placed in a firmly braked state.

Further, in the present embodiment, in a case where, for example, the battery goes dead or the solenoid 14 fails to function in a state wherein the shift lever 1 is locked in the "P" position, if the manual release member 33 is depressed, the actuator 16 of the solenoid 14 is moved toward the release position to release the restricted state of the lock member 11, thereby forcibly releasing the lock of the shift lever 1. Accordingly, even when a malfunction has occurred, it is possible to shift the shift lever 1 from the "P" position to the "N" position. For example, if a malfunction such as either of the above-described ones occurs in a state wherein the shift lever 1 is located in the "P" position, the vehicle cannot be moved even by pushing. However, since the manual release member 33 can be operated to release the the shift lever 1 from the locked state so that it can be shifted to, for example, the "N" position, the vehicle in which the malfunction has occurred can then be pushed.

In the above-described embodiment, when the supply of electricity of the solenoid 14 is off, the lock member 11 is held in the lock position to lock the shift lever 1 and, when the solenoid 14 is energized, the lock member 11 is released from the lock position to unlock the shift lever 1. Conversely, when the supply of electricity to the solenoid 14 is on, the shift lever 1 may be locked and, when the supply of electricity to the solenoid 14 is off, the shift lever 1 may be unlocked. In this arrangement, the manual release member 33 can be depressed to eliminate the problem that, irrespective of the presence of an "off" signal, the supply of electricity to the solenoid 14 remains on and the locked state is held, due to the breakdown of a control circuit. In this case, it is also desirable that when a vehicle's ignition is locked, the supply of electricity be cut off to prevent the unwanted overdischarge of the battery. The solenoid 14 may be of the type (a so-called two-way operation type solenoid) in which when the supply of electricity is switched off and its actuator is moved, the actuator, even after switched off, is held in a position which it has reached until the supply of electricity is switched on.

In the above-described embodiment, the solenoid 14 is employed as an electrically operated member. However, the solenoid 14 is not a limiting example and the electrically operated member may be, for example, of the type which employs a motor as a driving source.

In the above-described embodiment, the shift lever 1 is arranged to be locked in the "P" position, but may be locked in the "N" position which is the other non-driving position.

For the purpose of illustration, as the manual release member 33, a pushbutton which is operated by a depressing operation is employed but, for example, a lever which is operated by rotation operating may be used.

What is claimed is:

1. A locking apparatus for a shift lever of an automatic transmission of a vehicle to permit said shift lever to become operable under predetermined conditions, comprising:
   (a) detent means for inhibiting said shift lever from shifting to a vehicle driving position, at which said automatic transmission is set at a vehicle driving position, when said shift lever is set at a vehicle non-driving position, said detent means being movable between a shift-lever operating position and a lock position;
   (b) a lock member being movable together with said detent means between said lock position and said shift-lever operating position, at said shift lever non-driving position at which said automatic transmission is set in a vehicle non-driving position;
   (c) shift-lever releasing means for moving said detent means from said lock position to said shift-lever operating position to allow said shift lever to be shifted;
   (d) electrically operated means for holding said lock member to keep said detent means at said lock position and for releasing said held lock member in response to an electrical signal based on predetermined conditions thereby to make said shift-lever releasing means inoperable;
   (e) manual release means for releasing said held lock member and for allowing said shift lever to be shifted even when said shift-lever releasing means has not been made operable by said electrically operated means;
   whereby, said shift lever is able to be shifted to enable said vehicle to be moved even when said electrically operated means is operable.

2. An apparatus according to claim 1, wherein a link is interposed between said electrically operated means and said lock member, said lock member being held at said lock position due to engagement between said link and said lock member by said electrically operated means.

3. An apparatus according to claim 2, wherein said lock member releases said detent means to allow said shift lever to be shiftable when a vehicle's ignition key is switched from a locked state to a vehicle operating state and when a brake pedal is applied.

4. An apparatus according to claim 2, wherein said detent means includes a detent pin which is attached to said shift lever and which is located in correspondence with a guide portion of a detent plate provided in a vehicle body, a lock recess formed in said guide portion for accommodating said detent pin located at said lock position when said shift lever is located at said non-driving position, and a recess formed in said lock member for accommodating said detent pin when said shift lever has reached said non-driving position, said recess being arranged to render said shift-lever releasing means inoperative by inhibiting the movement of said detent pin toward said shift-lever operating position when said lock member is held at said lock position.

5. An apparatus according to claim 4, wherein said lock recess formed in said lock member tightly accommodates said detent pin in a direction parallel to the axis of movement of said detent pin between said lock position and said shift-lever operating position.

6. An apparatus according to claim 5, further comprising urging means wherein said link is urged in a direction in which said link engages with said lock member.

7. An apparatus according to claim 6, wherein said electrically operated means includes a driving source which is operated to disengage said link from said lock member upon the condition of the brake pedal of said vehicle being applied.

8. An apparatus according to claim 7, wherein said driving source of said electrically operated means is a solenoid.

9. An apparatus according to claim 5, wherein said manual release means has an inclined surface which serves to disengage said link from said lock member by the manual application of operating force.

10. An apparatus according to claim 1, wherein said manual release means has a pushbutton which partially projects into the area of the vehicle interior which is near said shift lever.

11. An apparatus according to claim 1, wherein, said electrically operated means releases said detent means to allow said shift lever to be shiftable when a vehicle's ignition key is switched from a locked state to a vehicle operating state and when a brake pedal is applied.

12. A locking apparatus for a shift lever in an automatic transmission of a vehicle to control shifting of said shift lever from a non-driving position where said automatic transmission does not transmit driving force of an engine to the wheels, to a driving position for transmitting the driving force of said engine to said wheels, comprising:
 (a) detent means for holding said shift lever in a non-driving position, said detent means being attached to said shift lever;
 (b) a lock member being movable together with said detent means being a lock position and a shift-lever operating position, at said shift lever non-driving position at which said automatic transmission is set at a vehicle non-driving position;
 (c) a shift-lever release button provided on said shift lever and responsive to being pushed for releasing the holding of said detent means and for allowing said shift-lever to be shiftable to said driving position;
 (d) an electrically operated member that allows said shift-lever release button to be pushed to release the detent means when the brake pedal of said vehicle is being applied; and
 (e) manual release means for releasing said held lock member and for allowing said shift lever to be shifted even when said shift-lever release button has not been made operable by said electrically operated member due to malfunction thereof.

13. An apparatus according to claim 12, wherein a link is interposed between said electrically operated member and said lock member, said lock member being held in said lock position due to engagement between said link and said lock member by said electrically operated means.

14. An apparatus according to claim 13, wherein said detent means includes a detent pin which is attached to said shift lever and which is located in correspondence with a guide portion of a detent plate provided in a vehicle body, a lock recess formed in said guide portion for accommodating said detent pin located at said lock position when said shift lever is located in said non-driving position, and a recess formed in said lock member for accommodating said detent pin when said shift lever has reached said non-driving position, said recess being arranged to render said shift-lever releasing button inoperative by inhibiting the movement of said detent pin toward said shift-lever operating position when said lock member is held at said lock position.

15. An apparatus according to claim 14, wherein said lock recess formed in said lock member tightly accommodates said detent pin in a direction parallel to the axis of movement of said detent pin between said lock position and said shift-lever operating position.

16. An apparatus according to claim 15, wherein the driving source of said electrically operated member is a solenoid.

17. An apparatus according to claim 15, wherein said manual release means has an inclined surface which serves to disengage said link from said lock member by the manual application of operating force.

18. An apparatus according to claim 12, wherein, said electrically operated member releases said detent means to allow said shift lever to be shiftable when a vehicle's ignition key is switched from a locked state to a vehicle operating state and when said brake pedal is applied.

19. A locking apparatus for a shift lever in an automatic transmission of a vehicle, comprising:
 a shift lever for selecting one from among a plurality of positions by rotary operation, and a pushbutton provided on said shift lever;
 a detent pin being movable in one direction by depressing said pushbutton provided on said shift lever;
 a detent plate having a lock recess for restricting the rotary operation of said shift lever in cooperation with said detent pin and for receiving and engaging with said detent pin when moved in another direction when said shift lever is shifted to a predetermined non-driving position;
 a lock member being movable between a lock position where said lock member cooperates with said detent pin engaged with said lock recess to restrict the movement of said detent pin and a lock release position where said detent pin is movable;
 an electrically operated member having an actuator and being operable in response to an electrical signal based on the occurrence of predetermined conditions when said shift lever is located in a particular non-driving position, said electrically operated member being movable between a holding position where said actuator holds said lock member in said lock position by operation of said electrically operated member and a release position where the holding of said lock member is released; and a manual release member being manually operable to forcibly move said actuator of said electrically operated member from said holding position to said release position.

20. A locking apparatus according to claim 19, wherein said manual release member has an operating section disposed in the vicinity of said shift lever within the vehicle.

21. A locking apparatus for a shift lever of an automatic transmission of a vehicle to permit said shift lever to become operable under predetermined conditions, comprising:
  (a) detent means for inhibiting said shift lever, when said shift lever is set at a vehicle non-driving position, from shifting to a vehicle driving position where said automatic transmission would also be set at a vehicle driving position, said detent means being movable between a shift-lever operating position and a lock position;
  (b) a lock member movable together with said detent means between said shift-lever operating position and said lock position, the movement of said lock member and said detent means occurring when said shift lever is set at a vehicle non-driving position;
  (c) shift-lever releasing means for moving said detent means from said lock position to said shift-lever operating position to allow said shift lever to be shifted;
  (d) electrically operated means for holding said lock member to keep said detent means at said lock position and for releasing said held lock member in response to an electrical signal based on predetermined conditions, thereby to make said shift-lever releasing means operable; and
  (e) manual release means for overriding said electrically operated means and making said shift-lever releasing means operable, said electrically operated means otherwise operating independently from said manual release means during conditions where said manual release means is not being operated.

* * * * *